United States Patent Office 3,321,023
Patented May 23, 1967

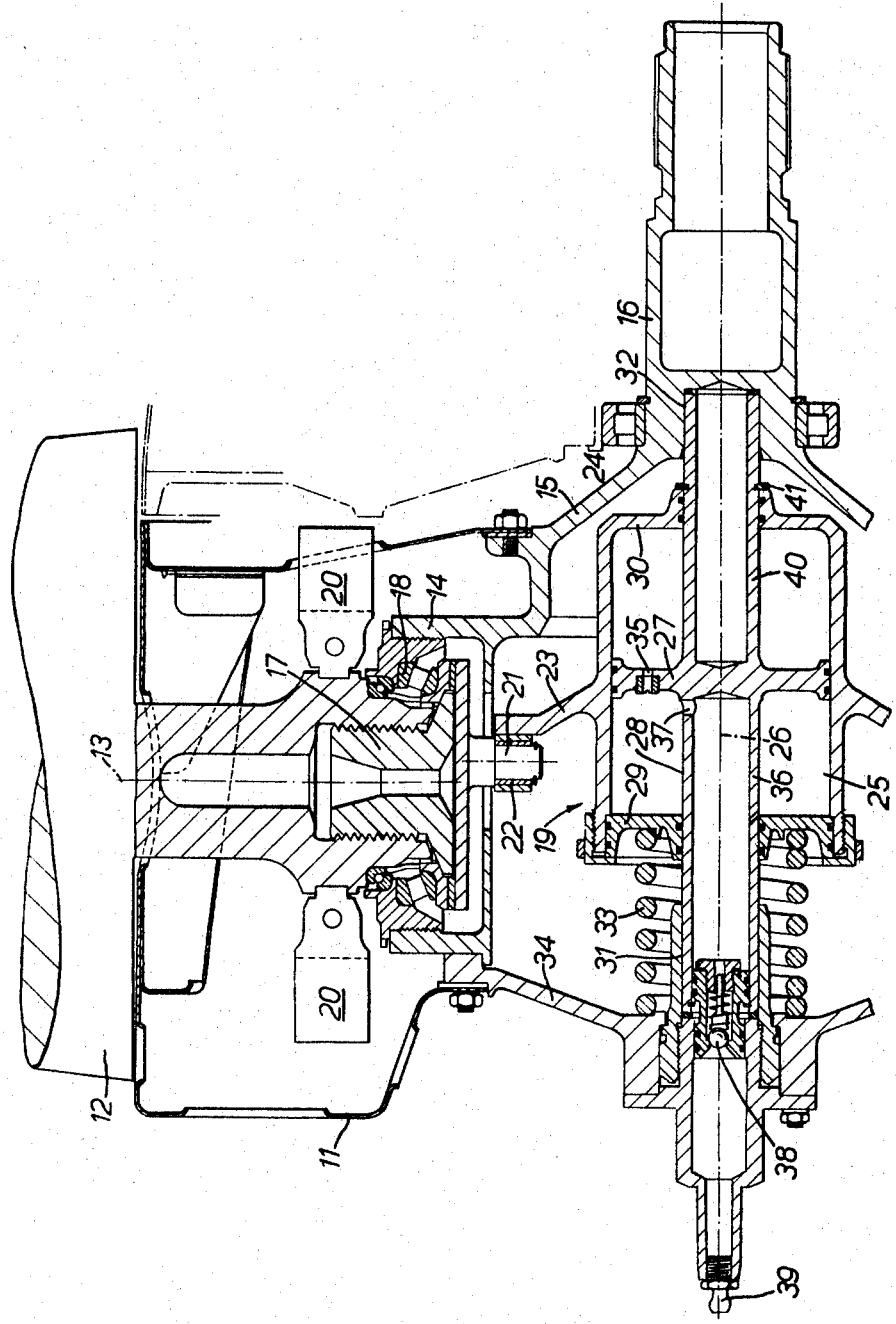

3,321,023
VARIABLE PITCH PROPELLERS
John G. Russell, Cheltenham, Robert M. Bass, Cranham, and Ernest J. Hellier, Cheltenham, England, assignors to Dowty Rotol Limited, Gloucester, England, a British company
Filed Feb. 3, 1966, Ser. No. 524,914
Claims priority, application Great Britain, Feb. 23, 1965, 7,778/65
6 Claims. (Cl. 170—160.51)

This invention relates to variable-pitch propellers.

According to this invention, all of the blades of a variable-pitch propeller, or certain of the blades, are each provided with at least one counterweight, so positioned thereon as to be capable of opposing centrifugal twisting moments inherent in the respective blade in operation of the propeller, the hub of the propeller, upon which the blades are mounted for pitch-changing movement, housing a fluid damper to the movable component of which the roots of all the blades are connected, said movable component being biased in the pitch-fining direction by spring means.

The spring means may be pre-loaded. During operation of the propeller below a predetermined speed, the spring means maintain the propeller blades in a predetermined fine pitch setting, but upon reaching said predetermined speed, the resultant moment, due to the counterweights, upon the blades overcomes the effort of the spring means and causes the blade pitch to coarsen, the rate of pitch change being controlled, within predetermined limits, by the fluid damper.

The damper may be of the piston-and-cylinder telescopic type wherein the cylinder thereof is the component to which the blades are connected and the piston thereof incorporates at least one metering orifice, the piston rod being fixedly supported with respect to the hub.

The counterweights may be fitted upon the blades at a position immediately adjacent their root portions.

Each blade may carry two counterweights extending radially-outwardly from the longitudinal pitch change axis of the blade, said counterweights being diametrically-oppositely disposed with respect to each other.

The spring means may be a mechanical coil spring interposed between one end wall of the hub and one end wall of the cylinder of the damper.

Stop means may be provided in the hub for limiting the range of pitch change of the blades. These stop means which may be engageable with the cylinder of the damper may be adjustable manually.

One embodiment of the invention will now be particularly described by way of example with reference to the accompanying drawing which is a cross-sectional side elevation of a part of a propeller in accordance with the invention.

Referring to the drawing, a variable-pitch propeller 11 includes four blades, one of which is shown at 12, and each of which is mounted for pitch-changing movement about its longitudinal axis 13 in hub arms 14 formed upon a propeller hub 15. This hub is provided with a splined shaft 16 by which the propeller is fitted to the driving shaft (not shown) of an associated engine (also not shown).

The root portion 17 of each blade is secured with respect to its hub arm 14 by means of a blade-root bearing assembly 18 in a manner whereby the blades can be removed from the hub without disturbing the pitch-change mechanism 19 contained within the hub.

At a position just radially-outwardly of the bearing assembly 18, each blade is provided with a pair of counterweights 20 fixedly secured thereto and extending in a direction radially-outwardly of the longitudinal pitch change axis 13, and diametrically-oppositely disposed.

A crank pin 21 is formed upon the root portion of each blade, each crank pin being offset from the longitudinal pitch change axis of its respective blade and engaging in a respective bearing 22 mounted upon an upstanding flange 23 formed upon a cylinder 24 housed within the hub 15. The cylinder 24 is the movable component of a piston-and-cylinder hydraulic damper 25 of telescopic type, whose longitudinal axis is co-incident with the rotational axis 26 of the propeller.

The piston 27 of the damper 25 is mounted upon a piston rod 28 which passes through both end walls 29 and 30 of the cylinder and which is fixedly supported in suitable bearings 31 and 32 formed in the forward and rearward end portions of the hub. Thus the piston 27 is rigidly fixed with respect to the hub 15, whilst with pitch-changing movement of the blades 12, the cylinder 24 is capable of sliding axially within the hub. This sliding movement of the cylinder in the pitch-coarsening direction of the blades is against the bias of a pre-loaded mechanical coil spring 33 interposed between the forward end wall 29 of the cylinder 24 and the forward end wall 34 of the hub 15.

The piston 27 of the hydraulic damper 25 is provided with a metering orifice 35, and the forwardly-directed portion 36 of the piston rod 28, which is hollow and which is in communication with the interior of the cylinder 24 through a suitable port 37, houses valve means 38 for facilitating the topping-up of liquid in the damper, which liquid is introduced through an external connection 39.

The rearward portion 40 of the piston rod 28 is provided with a ring 41, fixedly secured thereto, which acts as a stop means to limit movement of the cylinder, and thus of the blades, in the pitch-fining direction. The bearing 31 surrounding the forwardly-directed portion 36 of the piston rod 28 is sleeve-like, thereby to form a stop which limits the movement of the cylinder 24, and thus of the blades 12 in the pitch-coarsening direction. This bearing cum stop 31 is screw-threadedly-mounted within the forward end wall 34 of the hub in such a manner that it can be adjustable within predetermined limits by insertion of a tool (not shown) in convenient manner, into the hub structure. With rotation of this tool, rotation of the bearing-cum-stop 31 upon its screw-threads occurs, this resulting in axial adjustment of the coarse pitch stop.

During operation of the propeller, the twisting moments produced by the counterweights 20 attached to the blades 12 are arranged to be greater than, and of opposite sign to, those centrifugal twisting moments produced inherently in the blades, so that the resultant moments tend to turn the blades towards coarse pitch. However, this is prevented from occurring until a desired rotational speed of the propeller is reached, the pre-loaded mechanical coil spring 33 holding the blades at fine pitch. When this predetermined speed is reached, the resultant moments arising from the effect of the counterweights associated with the blades overcome the spring pre-load, and the blades move to their coarse pitch position, the cylinder 24 of the damper 25 displacing liquid in the chamber on the rearward side of the piston 27 through the metering orifice 35 into the chamber on the forward side of the piston. By the provision of this metering orifice, the blades are only permitted to move to their coarse pitch positions at a predetermined rate. In this embodiment, the metering orifice 35 imposes on this rate a maximum limit of two degrees per second.

When the rotational speed of the propeller falls upon shut-down of the driving engine, the effort of the mechanical coil spring 33 exceeds the diminishing centrifugal effort of the counter-weights 20 and the cylinder 24 moves rearwardly, liquid then passing from the forward side of the piston 27 to the rearward side, the blades thus returning to the fine pitch setting in readiness for the next start. Thus there is no necessity for manual re-setting of pitch.

The arrangement above described is completely self-contained and automatic in its operation, requiring no fluid-pressure supply from the driving engine.

Thus by the invention an automatic propeller is provided, operable at two fixed pitches, a fine pitch during start-up before the desired operating speed is reached, and a coarse pitch appropriate to normal operational running, the mechanism ensuring that the automatic change from fine pitch to coarse pitch occurs at a rate controlled automatically within predetermined limits.

Such a propeller is suitable for installation in unmanned aerial vehicles, and more particularly in unmanned aerial vehicle of the tethered kind.

In alternative embodiments of the invention, instead of providing all the blades each with a counterweight or counterweights, certain blades thereof, although connected to the fluid damper, are not so provided, the other blades which do carry counterweights being symmetrically arranged around the hub in a manner ensuring static, dynamic and aerodynamic balance of the propeller.

We claim as our invention:
1. A variable-pitch propeller comprising:
   (a) a hub rotatable about a relatively fixed axis,
   (b) blades on the hub capable of pitch changing movement about their longitudinal axes,
   (c) counterweights arranged on the root portions of the blades, externally of the hub, to oppose the centrifugal twisting moments inherent in the blades during the operation of the propeller,
   (d) a sealed fluid damper unit housed in the hub and having telescopic piston and cylinder components disposed on the rotational axis of the hub, the cylinder component of which has the blades connected therewith and is movable along the axis in the direction of coarser pitch, at a predetermined rate dictated by fluid flow in the unit, and
   (e) spring biasing means mounted on the rotational axis of the hub, in series with the damper components, to bias the cylinder component in the direction of finer pitch, said counterweights being effective at a particular propeller speed to overcome the bias of the spring means, and to produce movement of the cylinder component in the direction of coarser pitch, at the rate dictated by the unit,
   (f) the piston component of the damper unit having a hollow portion which communicates with the interior of the cylinder component, and valve means associated therewith for charging damper fluid into the unit, through the hollow portion.

2. A variable-pitch propeller according to claim 1 wherein the spring means are preloaded and comprise a mechanical coil spring interposed between end walls of the hub and the cylinder component.

3. A variable-pitch propeller according to claim 1 wherein the piston component of the damper unit has a metering orifice therein.

4. A variable-pitch propeller according to claim 1 wherein each blade has a pair of diametrically opposed counterweights thereon, extending radially outwardly from the longitudinal pitch-change axis thereof.

5. A variable-pitch propeller according to claim 1 wherein the hub has stop means thereon which cooperate with the cylinder component to limit the range of pitch change of the blades.

6. A variable-pitch propeller according to claim 5 wherein the stop means are manually adjustable.

References Cited by the Examiner
UNITED STATES PATENTS

| | | | |
|---|---|---|---|
| 2,160,745 | 5/1939 | Levy | 170—160.55 X |
| 3,177,948 | 4/1965 | Reid | 170—160.51 X |

FOREIGN PATENTS

| | | |
|---|---|---|
| 305,040 | 6/1919 | Germany. |
| 470,002 | 1/1929 | Germany. |
| 146,401 | 10/1921 | Great Britain. |
| 567,372 | 2/1945 | Great Britain. |

MARTIN P. SCHWADRON, *Primary Examiner.*
EVERETTE A. POWELL, Jr., *Examiner.*